United States Patent [19]
Washer

[11] Patent Number: 5,904,454
[45] Date of Patent: May 18, 1999

[54] TOOL FOR REMOVING DEBRIS FROM A HOLE SAW CUP

[76] Inventor: Jeffrey E. Washer, 576 Summer St., 3rd Floor, New Bedford, Mass. 02746

[21] Appl. No.: 09/097,289

[22] Filed: Jun. 12, 1998

[51] Int. Cl.⁶ .............................. B23B 47/34; B67B 7/02; B25B 7/00

[52] U.S. Cl. ........................... 408/67; 81/3.41; 294/99.2; 408/204; 408/241 R

[58] Field of Search ................................ 408/67, 68, 204, 408/241 R, 703; 81/3.41, 3.05; 294/26, 28, 99.2, 106, 164

[56] References Cited

U.S. PATENT DOCUMENTS

| | | | |
|---|---|---|---|
| 1,094,997 | 4/1914 | Jacquemin | 81/3.41 |
| 1,976,623 | 10/1934 | Monroe et al. | 294/99.2 |
| 2,145,129 | 1/1939 | Puccetti | 81/3.41 |

*Primary Examiner*—Steven C. Bishop
*Attorney, Agent, or Firm*—Harrison & Egbert

[57] ABSTRACT

A device for removing debris from a cup of a hole saw having a resilient wire bent so as to have an arc-like configuration with a gripping area formed thereon. The resilient wire has a first end extending inwardly and upwardly toward the gripping area. The resilient wire has a second end extending inwardly and upwardly toward the gripping area. The second end is at an opposite end of the resilient wire from the first end. The first end is angled outwardly from a side of a plane of the resilient wire. The second end is angled outwardly from an opposite side of the plane of the resilient wire. Each of the first and second ends has a rounded end point. The first and second ends extend upwardly from a bottom of the resilient wire at an angle of less than 90 degrees.

19 Claims, 3 Drawing Sheets

TOOL FOR REMOVING DEBRIS FROM A HOLE SAW CUP

TECHNICAL FIELD

The present invention relates to hole saws. More particularly, the present invention relates to apparatus and devices for removing slug debris from the cup of a hole saw.

BACKGROUND ART

Conventional hole saws include a cylindrical body having a circular series of saw teeth at one end and a mandrel including a shank attached to the opposite end wall of the cylindrical body. The shank is received into the chuck of an electric drill. The mandrel further includes a pilot drill which extends through the interior of the cylindrical body and past the saw teeth. The pilot drill thereby contacts the surface to be cut before the saw teeth in order to aid in the positioning of the hole saw.

Typically, hole saws include two or more clean-out slots which extend from slightly above the saw teeth toward the mandrel. The clean-out slots are useful in allowing sawdust to escape during the sawing process. This theoretically makes removal of the waste plug from within the interior of the hole saw easier.

In practice, it has been found that waste plugs are often difficult to remove from the interior of the hole saw. The slots do not allow sufficient sawdust to escape and the plug remains tightly bound within the interior of the hole saw. The waste plug is then usually removed by physically tapping the hole saw against an object or by trying to insert a thin object, such as a screwdriver tip, through one of the cleaning slots so as to push the waste plug out of the hole saw. Both of these methods are very unsatisfactory. Hole saws are fabricated from a relatively thin sheet stock which is not designed to take heavy forces along its side walls. Also, the screwdriver tips tend to tear and bend the hole saw walls. Additionally, if only one screwdriver is inserted into a hole, the waste plug tends to have a camming action which may wedge it even more tightly within the hole saw. The screwdriver can access only one slot at a time. As a result, the slug is forced in an outward direction at one slot opening and because there is a pilot bit extending through the axis of the slug, the opposite side of the slug moves in an opposite directly downwardly. The cup then has to be rotated 180 degrees to access the opposite slot in an attempt to force the opposite side of the slug outwardly of the cup. This procedure sometimes has to be repeated until the wedged slug is removed. This results in a frustrating, inconvenient and time consuming process.

In the past, various U.S. patents have issued relating to devices for removing slugs of material from the interior of circular hole saws or dies. For example, U.S. Pat. No. 2,433,058, issued on Dec. 23, 1947 to G. Mesaros describes a circular cutting and ejecting die in which a sleeve is freely mounted on the die and is adapted to engage the annular edge of the opening in the material produced by the cutting of the circular element therefrom. This serves to eliminate frictional engagement of the upper portion of the die therewith. The sleeve is apertured for permitting the lubrication of the confronting surfaces of the sleeve and die.

U.S. Pat. No. 4,652,185, issued on Mar. 24, 1987 to D. A. Malrick, describes a device for removing waste plugs from hole saws which includes a plug member positioned internally of a hole saw and retained therein by means of screws or other projections which extend outwardly through clean-out slots of the hole saw. The ring is grasped and forced downwardly causing the plug member to eject a waste plug from the hole saw.

U.S. Pat. No. 4,755,088, issued on Jul. 5, 1988 to J. Vajda, describes a tool for unjamming the material in a hole saw. This tool includes an adapter member constructed to be received within the interior of the cutter and provided at one end with an enlarged head for contacting the jammed material. The tool includes a slide hammer adapted to be interlocked with the other end of the adapter member for applying the force required to remove the adapter member and the jammed material from the interior of the hole saw cutter.

U.S. Pat. No. 5,035,548, issued on Jul. 30, 1991, to J. A. Pidgeon, teaches a hole saw driver and extruder which includes a flanged irregular bushing fitted through a corresponding irregular hole in the base of a conventional hole saw and which supports a cylindrical shank which extends from the back of the hole saw. Either the bushing or the shank is internally threaded. The collar is free to reciprocate on the shank and has pins projecting through corresponding holes through the base of the hole saw into the cup of the saw. When the collar is positioned away from the base of the hole saw, the pins extend only a short distance into the cup of the saw so as to permit the mandrel to be threaded deeply into the saw with the fingers on the end of the saw close to the saw base. When the collar is moved closer to the saw base, the pins extend deeper into the cup of the saw so as to block revolution of the mandrel fingers in the saw so that when the mandrel is rotated from in back of the saw, torque is transmitted to the saw for sawing. When the collar is moved away from the saw base, the collar pins are withdrawn from contact with the mandrel fingers and the mandrel is free to be threaded out through the hole saw to extrude any residual sawed material from within the saw.

U.S. Pat. No. 5,076,741, issued on Dec. 31, 1991 to J. M. Littlehorn, describes a plug ejecting hole saw which has no shoulder stop on the mandrel and extended threads on the mandrel so that after a hole is cut, the clutch is moved away from the saw. The saw is held from rotating and the mandrel is threaded further so that its end ejects the plug.

U.S. Pat. No. 5,435,672, issued on Jul. 25, 1995 to Hall et al., describes a hole saw with a plug ejection feature. The arbor of an ordinary commercially available hole saw is replaced. An arbor nut is threaded into the hole saw cup axial threaded inlet so as to convert the ordinary hole saw into a plug ejecting hole saw. The arbor and the arbor nut of the plug ejecting hole saw function as the arbor of an ordinary hole saw when used to drill the desired hole. When the drill rotation is reversed to a counterclockwise direction and the hole saw cup is held stationary, the arbor screws through the stationary arbor nut so as to eject the plug from the hole saw cup.

It is an object of the present invention to provide a faster, more convenient method and apparatus for removing debris from a hole saw cup.

It is another object of the present invention to provide a tool for the removal of debris from a hole saw cup which is adaptable to various sizes of such hole saws.

It is another object of the present invention to provide a tool for the removal of debris from a hole saw cup which provides rotational movement for aiding in the removal of slugs of material.

It is another object of the present invention to provide a tool for the removal of debris from a hole saw cup which facilitates easy gripping of the tool.

It is another object of the present invention to provide a tool for the removal of debris from a hole saw cup which is light in weight and suitable for compact storage.

It is a further object of the present invention to provide a tool for the removal of debris from a hole saw cup that is easy to manufacture, easy to use and relatively inexpensive.

These and other objects and advantages of the present invention will become apparent from a reading of the attached specification and appended claims.

SUMMARY OF THE INVENTION

The present invention is a device for removing debris from the cup of a hole saw which comprises a resilient wire bent so as to have an arc-like configuration. The resilient wire has a gripping area formed thereon. The resilient wire has a first end extending inwardly and upwardly toward the gripping area. The resilient wire has a second end extending inwardly and upwardly toward the gripping area. The second end is at an opposite end of the resilient wire from the first end.

The arc-like configuration of the resilient wire is a generally inverted V-shaped configuration. The gripping area is coated with a polymeric material such that the resilient wire at the gripping area has a greater diameter than a diameter of the resilient wire at the first and second ends. Each of the first and second ends has a rounded end point. The first end is bent from a bottom of the resilient wire so as to extend upwardly from the bottom of the resilient wire at an angle of less than 90 degrees. Similarly, the second end is bent from the bottom of the resilient wire so as to extend upwardly from the bottom at an angle of less than 90 degrees. The first and second ends have end points positioned below the gripping area and above the bottom of the resilient wire. The first and second ends have equal lengths and extend at generally equal angles from the bottom of the resilient wire.

In the present invention, the gripping area is located in a common plane. The first end extends outwardly from one side of the common plane and has an end point residing in the common plane. The second end extends outwardly from an opposite side of the common plane and has an end point residing in the common plane.

DETAILED DESCRIPTION OF THE PRESENT INVENTION

Figure 1:
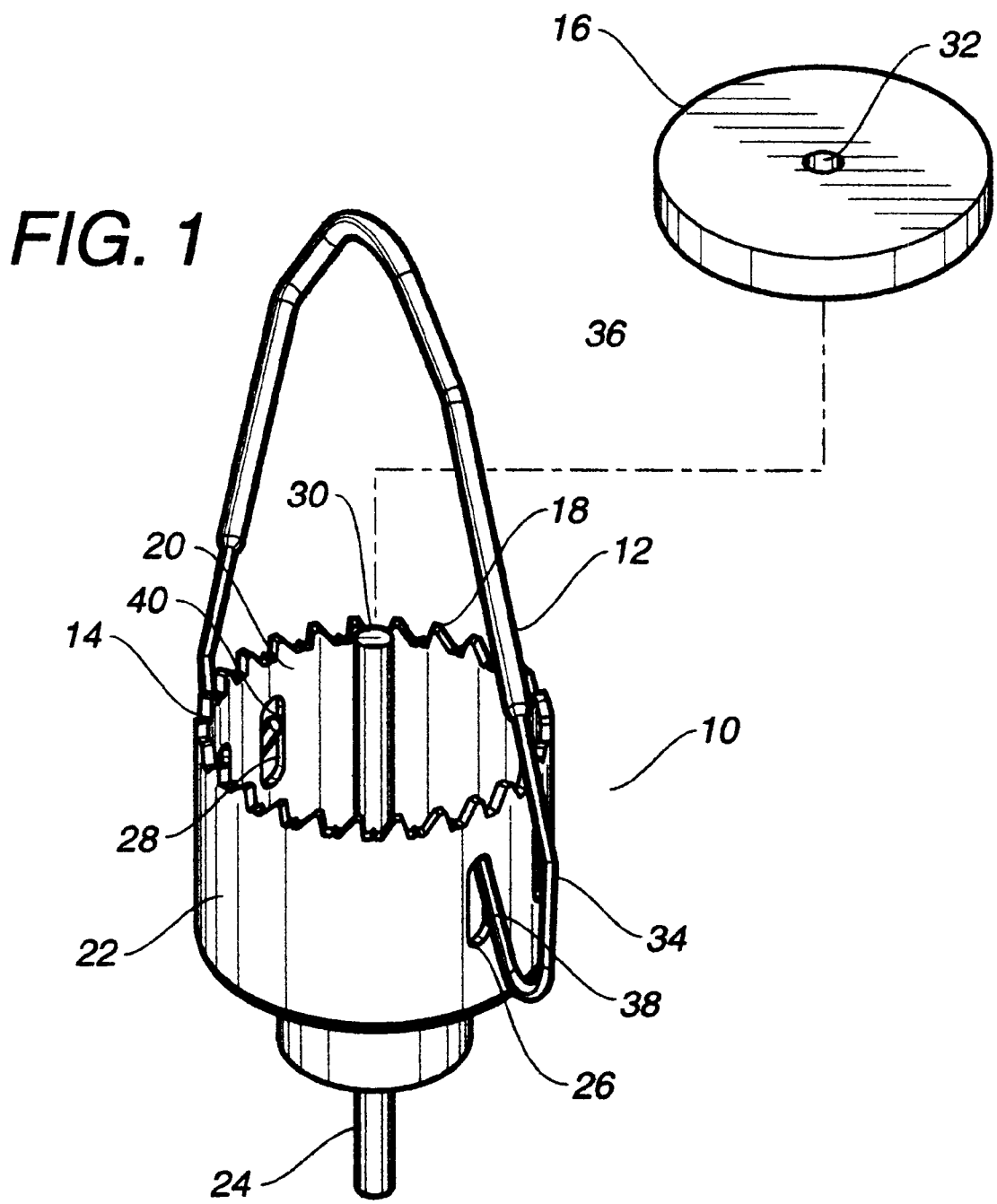
FIG. 1 is a perspective exploded view showing the device of the present invention as applied to a hole saw.

Referring to FIG. 1, there is shown at 10 the apparatus of the present invention for the removal of slugs from a hole saw. The actual device for the removal of the debris from the interior cup of the hole saw is illustrated at 12. The hole saw bit is illustrated at 14. The slug of material is shown, in an exploded manner and designated at 16.

In FIG. 1, it can be seen that the hole saw bit 14 has a cutting edge 18 formed at one end thereof. A cylindrical cup 20 is formed on the interior of the body 22 of the hole saw 14. A shank 24 extends downwardly from the bottom of the hole saw 14 so as to allow the hole saw 14 to be connected to a suitable electric drill. As can be seen in FIG. 1, the body 22 of the hole saw 14 has a first opening 26 formed through a wall thereof so as to open to the cup 20 on the interior of body 22. A second opening 28 is formed on an opposite side of the body 22 from the first opening 26. The opening 28 extends through the wall of the body 22 so as to open to the interior of the cup 20. A pilot bit 30 extends axially through the interior of the cup 20.

In normal use, when the hole saw 14 is actually operated, a slug 16 of material will accumulate on the interior of the cup 20. Normally, the slug 16 will be of a circular configuration with a central opening 32 extending around the pilot bit 30. Prior to the present invention, the removal of the slug 16 from the interior of cup 20 has been very difficult, frustrating and time consuming. However, the device 12 of the present invention provides a suitable technique for the removal of the slug 16.

The device 12 includes a resilient wire 34 which is bent so as to have a generally arc-like configuration. The resilient wire 34 has a gripping area 36 formed thereon. The resilient wire 34 has a first end 38 extending inwardly and upwardly toward the gripping area 36. The resilient wire 34 has a second end 40 which also extends inwardly and upwardly toward the gripping area 36. The second end 40 is located at an opposite end of the resilient wire 34 from the first end 38. As can be seen, in actual use, the gripping area 36 is suitably gripped such that the first end 38 and the second end 40 are inserted into the openings 26 and 28, respectively, in the hole saw 14. The end points of the ends 38 and 40 are used so as to push the slug 16 outwardly of the open end of the hole saw 14. As will be described hereinafter, the ends 38 and 40 are configured so as to universally access straight, slanted or round slots of different type of hole saw cups and to provide a rotational action for the easy removal of the slug 16. The gripping area 36 is gripped and forced upwardly so as to cause the ends 38 and 40 to grasp the underside of the slug 16 for ejection out of the cup. This results in equal and opposite simultaneous rotational forces for the removal of the slug 16.

Figure 2:
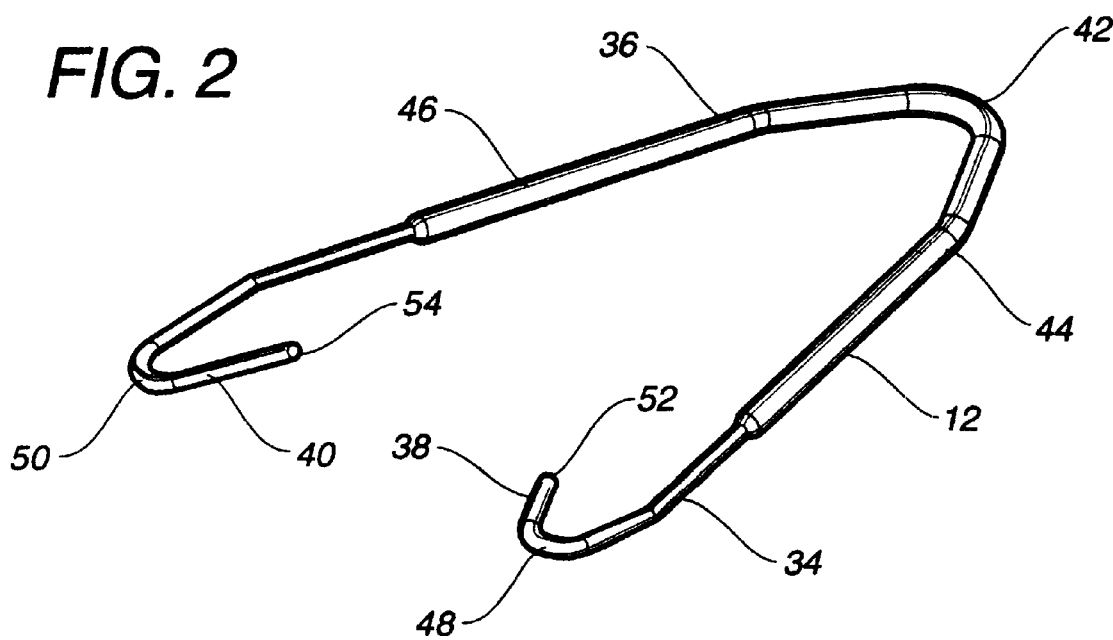
FIG. 2 is a perspective view of the device of the present invention.

FIG. 2 more clearly illustrates the device 12 of the present invention. As can be seen in FIG. 2, the device 12 includes the resilient wire 34 which is suitably bent so as to have a generally inverted V-shaped configuration. The wire 34 is suitably bent at vertex 42. The gripping area 36 extends downwardly from the vertex 42 toward the first end 38 and the second end 40. The gripping area 36 is coated with a polymeric material, such as a vinyl material, such that the gripping area 36 has a greater diameter than the diameter of the ends 38 and 40.

The resilient wire 34 is an inverted V-shaped device formed of a thin elongated round wire having a resilient composition of spring steel or plastic. The gripping area 36 should have a length suitable for gripping the device 12. The resilient wire 34 incurvates at predetermined angles so as to form the first end 38 and the second end 40. The first end 38 will extend upwardly and inwardly from the bottom 48 at an angle of less than 90 degrees. Similarly, the second end 40 will extend inwardly and upwardly from the bottom 50 at an angle of less than 90 degrees. The end 38 has an end point 52. The end 40 has an end point 54. End points 52 and 54 are rounded so as to avoid the gouging of the plug 16.

Figure 3:
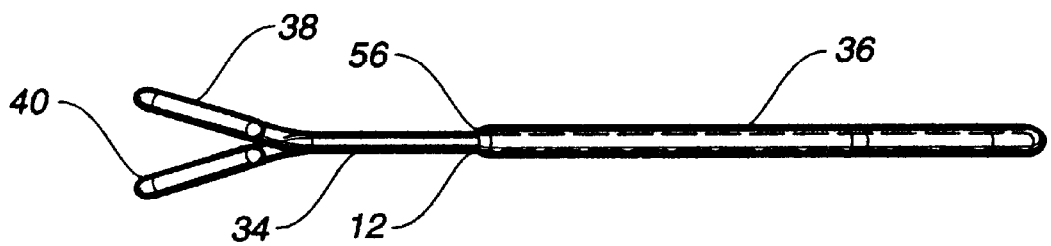
FIG. 3 is a side elevational view of the device of the present invention.

As can be seen in FIG. 3, the gripping area 36 of the device 12 resides in a common plane. It can be seen that the gripping area 36 is formed of a vinyl material which feathers at end 56 toward the resilient wire 34. The first end 38 is illustrated as extending outwardly from one side of the common plane in which the gripping area 36 resides. The second end 40 is illustrated as extending outwardly and angularly from the opposite side of the common plane in which the gripping area 36 resides. This unique outward angling of the ends 38 and 40 facilitates the ability to apply rotational movement to the slug 16 residing within the hole saw 14. Each of the ends 38 and 40 should have a diameter which is less than the diameter or width of the openings 26 and 28 formed within the hole saw 14 so that the ends 38 and 40 can be easily inserted into such openings.

Figure 4:
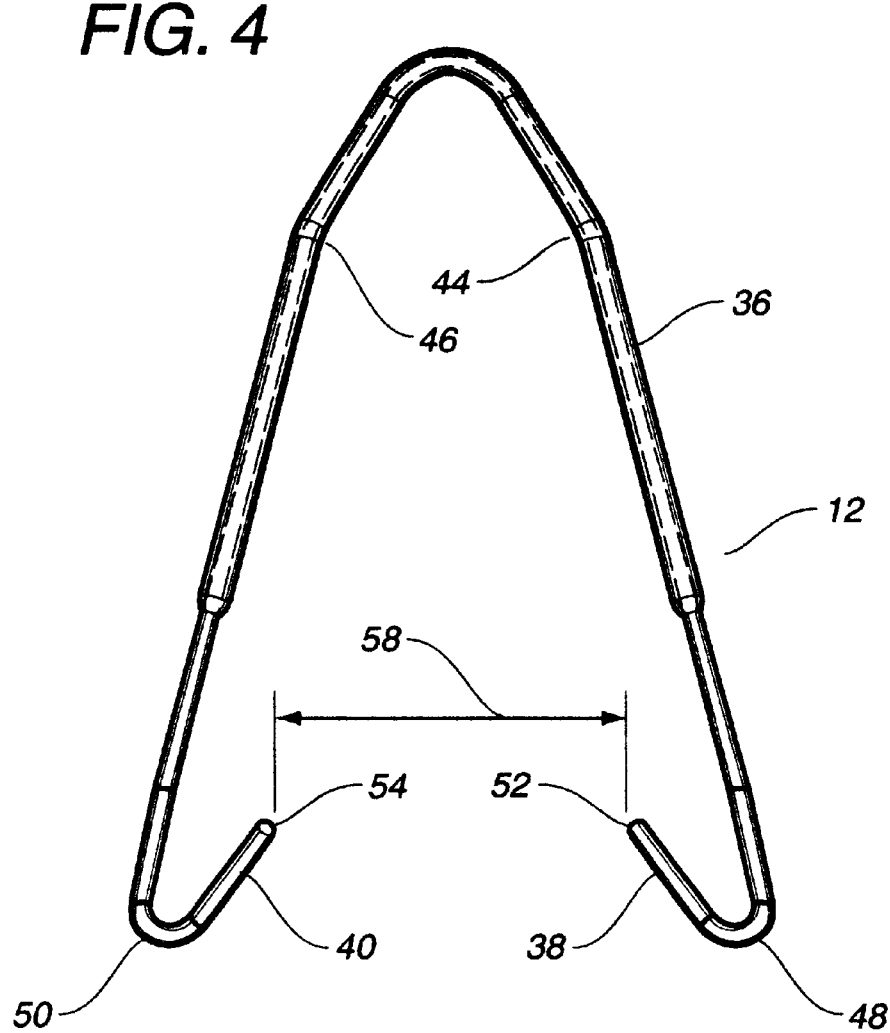
FIG. 4 is a plan view of the device of the present invention.

In FIG. 4, it can be seen that the device 12 includes arms 44 and 46 which have gripping area 36 formed thereon. The first end 38 will extend inwardly and upwardly from the bottom 48 of the device 12. Similarly, the second end 40 will extend inwardly and upwardly from the bottom 50 of the device 12. By applying pressure on the arms 44 and 46, the end points 52 and 54 can be drawn closer to each other so as to be adaptable to various diameters of hole saws 14. The end points 52 and 54 of ends 38 and 40, respectively, will reside on opposite sides of the pilot bit 30 when the device 12 is installed within the openings 26 and 28 of the hole saw 14. The ends 38 and 40 have an adequate length so as to extend past the cutting edge 18 of the hole saw 14. As such, the ends 38 and 40 should have a length which is greater than a distance of the openings 26 and 28 from the cutting edge 18 of the hole saw 14. When the arms 44 and 46 are gripped and squeezed, the end points 52 and 54 will be a suitable distance apart from each other for placement into the openings 38 and 40 of the hole saw cup 20. These end points 52 and 54 will reside below the debris within the hole saw 14. The gripping area 36 is gripped and forced upwardly so as to cause the end points 52 and 54 to grasp the underside of the debris for ejection out of the cup 20.

Figure 5:
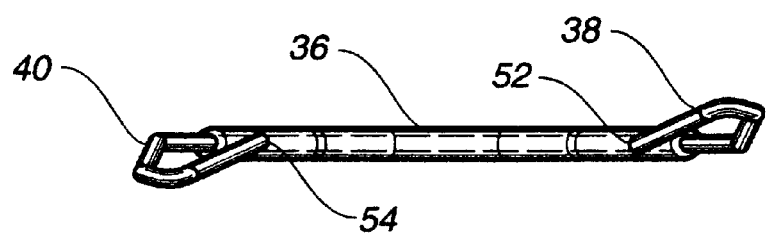
FIG. 5 is an end view of the device of the present invention.

FIG. 5 illustrates how the first end 38 and the second end 40 are curved so as to facilitate the rotational movement of the slug 16 from the interior of the cup 20. As can be seen, the gripping area 36 extends in a common plane. The first end 38 extends outwardly from one side of the common plane of the gripping area 36 and then returns such that the end point 52 will reside within the common plane of the gripping area 36. Similarly, the second end 40 will extend outwardly from the common plane of the gripping area 36 so as to have the end point 54 return and reside within the common plane of the gripping area 36. This arrangement results in equal and opposite simultaneous rotational forces for the removal of the debris from the cup 20 of the hole saw 14.

The present invention provides an affordable solution to a long felt need. The device 12 is lightweight and can be squeezed inwardly for compact storage. The device 12 can be easily manufactured and is relatively inexpensive.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A device for removing debris from a cup of a hole saw comprising:

a resilient wire being bent so as to have an arc-like configuration, said resilient wire having a gripping area formed thereon, said resilient wire having a first end extending inwardly and upwardly toward said gripping area, said resilient wire having a second end extending inwardly and upwardly toward said gripping area, said second end being at an opposite end of said resilient wire from said first end, said first end being angled outwardly from a side of a plane of said resilient wire.

2. The device of claim 1, the hole saw having an opening formed through a wall thereof so as to open to an interior of said cup, said resilient wire having a diameter suitable for fitting through the opening.

3. The device of claim 1, said arc-like configuration being a generally inverted V-shaped configuration.

4. The device of claim 1, said gripping area being coated with a polymeric material such that said resilient wire at said gripping area has a greater diameter than a diameter of said resilient wire at said first and second ends.

5. The device of claim 1, each of said first and second ends having a rounded end point.

6. The device of claim 1, said second end being angled outwardly from an opposite side of said plane of said resilient wire.

7. The device of claim 1, said first end being bent from a bottom of said resilient wire so as to extend upwardly from said bottom at an angle of less than 90 degrees.

8. The device of claim 7, said first end having an end point positioned below said gripping area.

9. The device of claim 7, said second end being bent from the bottom of said resilient wire so as to extend upwardly from said bottom at an angle of less than 90 degrees, said second end having a length equal to a length of said first end.

10. The device of claim 1, said first end having an end point which is spaced from an end point of said second end by a distance which is less than a diameter of the cup of the hole saw.

11. A device for removing debris from a cup of a hole saw comprising:

a resilient wire being bent so as to have an arc-like configuration, said resilient wire having a gripping area formed thereon, said resilient wire having a first end extending inwardly and upwardly toward said gripping area, said resilient wire having a second end extending inwardly and upwardly toward said gripping area, said second end being at an opposite end of said resilient wire from said first end, said gripping area being in a common plane, said first end extending outwardly from one side of said common plane and having an end point residing in said common plane, said second end extending outwardly from an opposite side of said common plane and having an end point residing in said common plane.

12. An apparatus comprising:

a hole saw having a cup formed therein, said hole saw having a first opening extending through a wall of said hole saw so as to open to an interior of said cup, said hole saw having a second opening extending through said wall so as to open to an interior of said cup; and a resilient wire being bent so as to have an arc-like configuration, said resilient wire having a first end removably receivable within said first opening, said resilient wire having a second end removably receivable within said second opening.

13. The apparatus of claim 12, said resilient wire having a gripping area formed above said first and second ends, said gripping area extending over said cup when said first and second ends are received within said first and second openings, respectively.

14. The apparatus of claim 13, said first end extending inwardly and upwardly toward said gripping area, said second end extending inwardly and upwardly toward said gripping area at an opposite end of said resilient wire.

15. The apparatus of claim 12, said first and second ends having a diameter less than a diameter or a width of either of said first and second openings.

16. The apparatus of claim 12, each of said first and second ends having a rounded end point.

17. The apparatus of claim 12, said hole saw having a cutting edge formed thereon, each of said first and second ends having a length greater than a distance of said first opening from said cutting edge.

18. The apparatus of claim 12, said first end being bent from a bottom of said resilient wire so as to extend upwardly from said bottom at an angle of less than 90 degrees, said second end being bent from a bottom of said resilient wire so as to extend upwardly from said bottom at an angle of less than 90 degrees.

19. The apparatus of claim 13, said gripping area being in a common plane, said first end extending outwardly from one side of said common plane and having an end point residing in said common plane, said second end extending outwardly from an opposite side of said common plane and having an end point residing in said common plane.

\* \* \* \* \*